United States Patent [19]

Jones et al.

[11] Patent Number: 4,716,614
[45] Date of Patent: Jan. 5, 1988

[54] DEVICE FOR MONITORING THE PROCESS OF TOOTHBRUSHING

[76] Inventors: Arthur R. Jones, 272 Ferndale Place, Waterloo, Ontario, Canada, N2J 3X9; John D. Jones, R.R. #1, Dorchester, Ontario, Canada, N0L 1G0

[21] Appl. No.: 852,564

[22] Filed: Apr. 16, 1986

[30] Foreign Application Priority Data

Nov. 7, 1985 [CA] Canada ................................ 494795

[51] Int. Cl.$^4$ ............................................. A46B 9/04
[52] U.S. Cl. ........................................ 15/105; 15/176; 15/167.1; 73/862.26; 434/263
[58] Field of Search ................ 15/105, 167 R, 176; 434/263; 116/202, 212; 73/862.42, 862.62, 862.54, 862.65, 862.26, 862.23, 862.35, 862.04

[56] References Cited

U.S. PATENT DOCUMENTS

| | | |
|---|---|---|
| 3,561,280 | 2/1971 | MacPhee et al. ................ 73/862.04 |
| 3,970,155 | 7/1976 | Otto ................................ 73/862.26 |
| 4,006,629 | 2/1977 | Barrett et al. .................... 73/862.26 |
| 4,253,212 | 3/1981 | Fujita ................................ 15/167 R |
| 4,562,746 | 1/1986 | Petit ................................ 73/862.23 |
| 4,598,437 | 7/1986 | Ernest et al. .......................... 15/176 |

OTHER PUBLICATIONS

Fraleigh, McElhaney and Heisser, "Toothbrushing Force Study", *Journal of Dent., Res.*, Jan. Feb. 1967, vol. 46, pp. 209–214.

Allen and Nahodil, "A Transducer for Measuring the Force Exerted on Teeth by A Toothbrush During Brushing", *J. Dent. Res. Supplement To*, No. 5, p. 1272.

White, "Toothbrush Pressures of Orthodontic Patients", *American Journal of Orthodontics*, (Feb. 1983).

*Primary Examiner*—Peter Feldman
*Attorney, Agent, or Firm*—Daryl W. Schnurr

[57] ABSTRACT

A device for monitoring the process of toothbrushing has a handle that is electrically connected to signalling means. The handle has a neck and the neck is designed to consecutively receive various heads of toothbrushes. Removable and replaceable heads, with numerous bristles thereon, can be consecutively mounted on said handle. There are sensing means on the neck to continuously measure a bending moment of the area to which said sensing means is attached. As pressure is exerted on bristles of the head, that pressure is transmitted to said neck and the signalling means can be activated. The device is useful in teaching appropriate methods of brushing, thereby reducing or eliminating abrasion of the teeth. In addition to pressure, the device is able to monitor frequency, duration and direction of brushing.

28 Claims, 19 Drawing Figures

DEVICE FOR MONITORING THE PROCESS OF TOOTHBRUSHING

BACKGROUND OF THE INVENTION

1. Field of the Invention

This invention relates to a device for monitoring the process of toothbrushing and, more particularly, relates to a toothbrush that is electrically connected to signalling means to measure various factors relating to the process of toothbrushing.

2. Description of the Prior Art

Cervical abrasion of teeth is the pathologic wearing away of tooth substance through some abnormal mechanical process. Abrasion usually occurs on the exposed root surfaces of teeth, but may be seen elsewhere as well. Although modern dentifrices are not sufficiently abrasive to damage intact enamel severely, remarkable wear of cementum and dentin can occur if the toothbrush is improperly used. Cervical abrasion has been found to occur in a high proportion of dental patients and is usually caused by improper brushing. In some instances, abrasion of a patient's teeth will be much more severe on one side of the patient's mouth than on the other side. The risk of serious abrasion increases as the gingiva recedes to expose the cementum enamel junction. However, abrasion can still occur when the cementum enamel junction is covered by the gingiva. As a result, there has been a serious need for some time for a device and method for monitoring the process of toothbrushing.

It is known to have toothbrushes that contain a spring and are designed to flex when a certain level of pressure is exerted onto a head of the toothbrush. Further, as described in U.S. Pat. No. 4,253,212 issued on Mar. 3, 1981 to Fujita and being entitled "Training Appliance for Toothbrushing", it is known to have a toothbrush where pressure sensitive elements, such as electrodes are buried in the stem of a toothbrush and connected to an audio or visual signal when a particular pressure has been exceeded. However, these previous devices only measure pressure at a particular instant; or, they only measure a maximum pressure; or, they measure pressure in one dimension only; or, they cannot be used to monitor the severity of a toothbrushing problem; or, they cannot measure pressure continuously; or, they cannot be used to establish guidelines for proper toothbrushing; or, they cannot be used to properly monitor other factors that are important in toothbrushing such as frequency (i.e. number of strokes per second), duration and type of brushing strokes; or, they monitor only one type of brushing stroke; or, they monitor a brushing stroke at a particular instant of time; or, they are not designed to be used for more than one person; or, they do not have sufficient versatility; or, they are not sensitive enough to measure small amounts of pressure; or, they cannot be readily calibrated.

SUMMARY OF THE INVENTION

It is the object of the present invention to provide a device for monitoring the process of toothbrushing whereby pressure of bristles on the teeth can be measured simply, continuously and accurately.

In accordance with the present invention, a device for monitoring the process of toothbrushing comprises a toothbrush having a handle with a neck and a removable and replaceable head. The neck is located between said head and a remainder of said handle. The neck has means to consecutively receive various heads so that when pressure is exerted on said head it will be transmitted to said neck. The head has numerous bristles thereon and said bristles have a free end. The handle has at least two sets of sensing means affixed thereto in an area of said neck to linearly measure a bending moment of the area to which said sensing means is attached. The handle has two non-parallel planes with one set of sensing means on each plane, each plane being parallel to a longitudinal axis of said handle. The sensing means is electrically connected to different signally means so that a two dimensional signal can be activated as pressure is exerted on said bristles.

DESCRIPTION OF A PREFERRED EMBODIMENT

Figure 1:
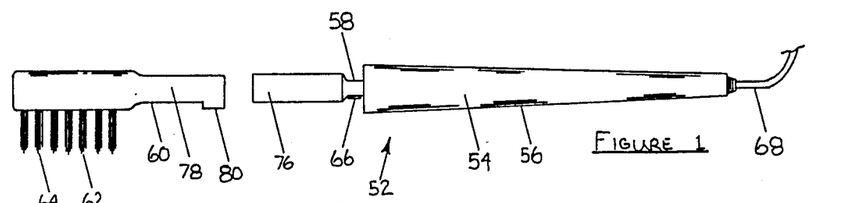
FIG. 1 is an exploded side view of a head and handle of a toothbrush.

In FIG. 1, a device 52 for monitoring the process of toothbrushing has a toothbrush 54 having a handle 56 with a neck 58 and a removable and replaceable head 60. In this particular embodiment, the neck 58 is a narrowed portion located between the head 60 and a remainder of said handle 56. While it is preferable that the neck be a narrowed portion relative to the head and handle, variations could be made whereby the neck is not narrower than the handle or the head or both. Regardless of the relative size of the neck, it is that part of the handle located between the head and the remainder of the handle. The head 60 has numerous bristles 62 located thereon and said bristles have a free end 64. The handle has sensing means 66 affixed thereto in an area of said neck to linearly measure a bending moment of the area to which said sensing means is attached. The sensing means 66 is a strain gauge that is affixed to the neck 58 of the handle 56. The sensing means 66 is electrically connected to signalling means through the handle 56 and a wire 68 so that a signal can be activated as pressure is exerted on said bristles 62. The signalling device is not shown in FIG. 1. The neck 58 has means to consecutively receive heads 60 so that, when pressure is exerted on said head, it will be transmitted to said neck 58.

Figure 2:
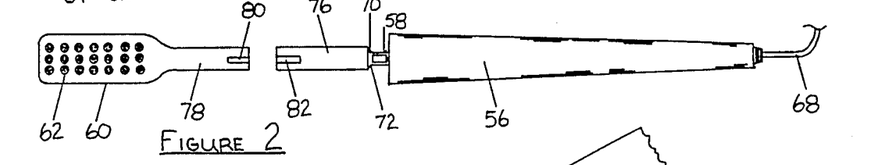
FIG. 2 is a bottom view of the toothbrush of FIG. 1.

It can be seen from FIGS. 1 and 2 that the neck 58 has at least two planes 70, 72 that are normal to each other and that sensing means 66 is located on each of said two planes. Actually, the neck 58 has two sets of two planes each that are normal to one another, but the sensing means 66 is only located on one set of planes 70, 72. It can further be seen that one of said planes 70 is parallel to a plane through the free end 64 of said bristles.

Figure 3:
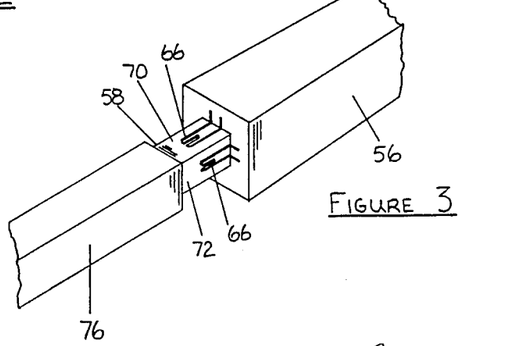
FIG. 3 is a partial perspective view of uncovered strain gauges on said handle.
Figure 4:
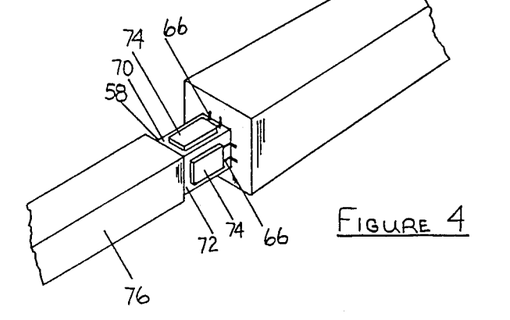
FIG. 4 is a partial perspective view of covered strain gauges on said handle.

In FIGS. 3 and 4, it can be seen that each of said planes 70, 72 have an identical width and the neck 58 has a square cross-section. Also, the strain gauges 66 have wires that extend into said handle 56 and through said handle (not shown) to said wire 68. In FIG. 4, the strain gauges 66 are covered with a protective coating 74. Each of the strain gauges are located on the surface of said neck. While it would be possible to embed the strain gauges or other sensing means within the neck, it is believed that the device will achieve good results when the strain gauges or other sensing means are located on an external surface or surfaces of said neck where they are accessible for adjustment or repair purposes. From FIG. 3, it can be seen that the two strain gauges 66 are each mounted on the planes 70, 72 in identical positions, both longitudinally and laterally, relative to said planes.

In FIGS. 1 and 2, a collar 76 is the means to receive various heads. The collar 76 is rigid and hollow and is affixed to the neck 58 of the handle 56, with the collar extending beyond said neck 58. The head 60 has a base 78 that has a similar shape to said collar 76, except that said base has a slightly smaller cross-sectional size than an internal cross-sectional size of said collar so that said base 78 will removably fit snugly within said collar. Preferably, the collar 76 and base 78 are sized to achieve a friction fit. The base 78 of the head 60 has an abutment 80 thereon of similar size and shape, but slightly smaller than a slot 82 on the collar 76 so that the base 78 can slide into said collar 76 with the abutment 80 located within said slot 82. This can best be seen from FIG. 5. The base of the head and the collar could be designed in many different ways to accomplish the purposes of the present invention. For example, the head and collar could have corresponding tapered, rounded or rectangular shapes or corresponding screw threads.

Figure 5:
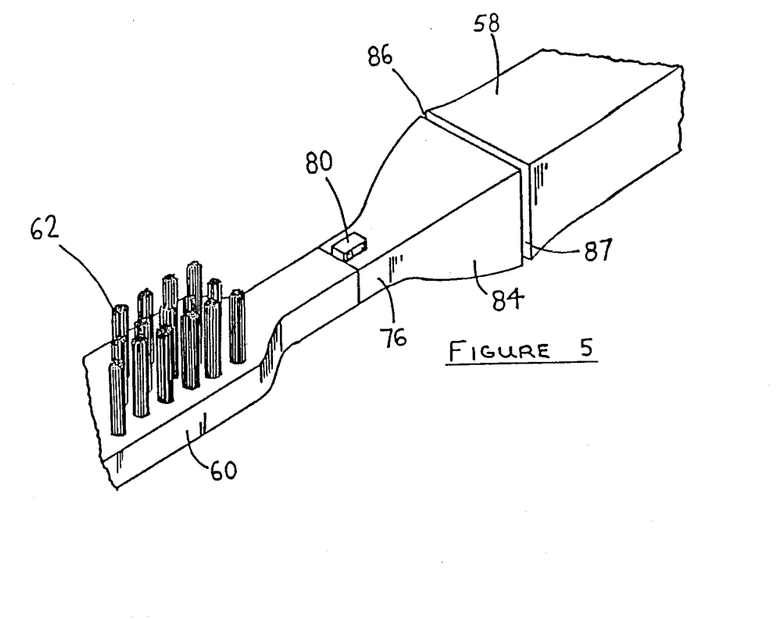
FIG. 5 is an enlarged partial perspective view of a head installed in said handle with a collar having a skirt extending therefrom.

Also, in FIG. 5, the collar 76 has a skirt 84 that is an integral part of said collar 76, said skirt 84 extending outwards towards a remainder of said handle 58. The purpose of the skirt 84 is to provide a protective cover for the strain gauges 66. If desired, the skirt could be a separate component from the rest of the collar. A gap 86 is located between the skirt 84 and the handle 56 so that the movement of the neck 58 is not restricted by an edge 87 of the skirt 84 contacting the handle 56 as pressure is exerted on the head 60. For ease of illustration, the size of the gap 86 is exaggerated in the drawing. If the skirt is slidable relative to the collar, the gap 86 can be eliminated.

Figure 6:
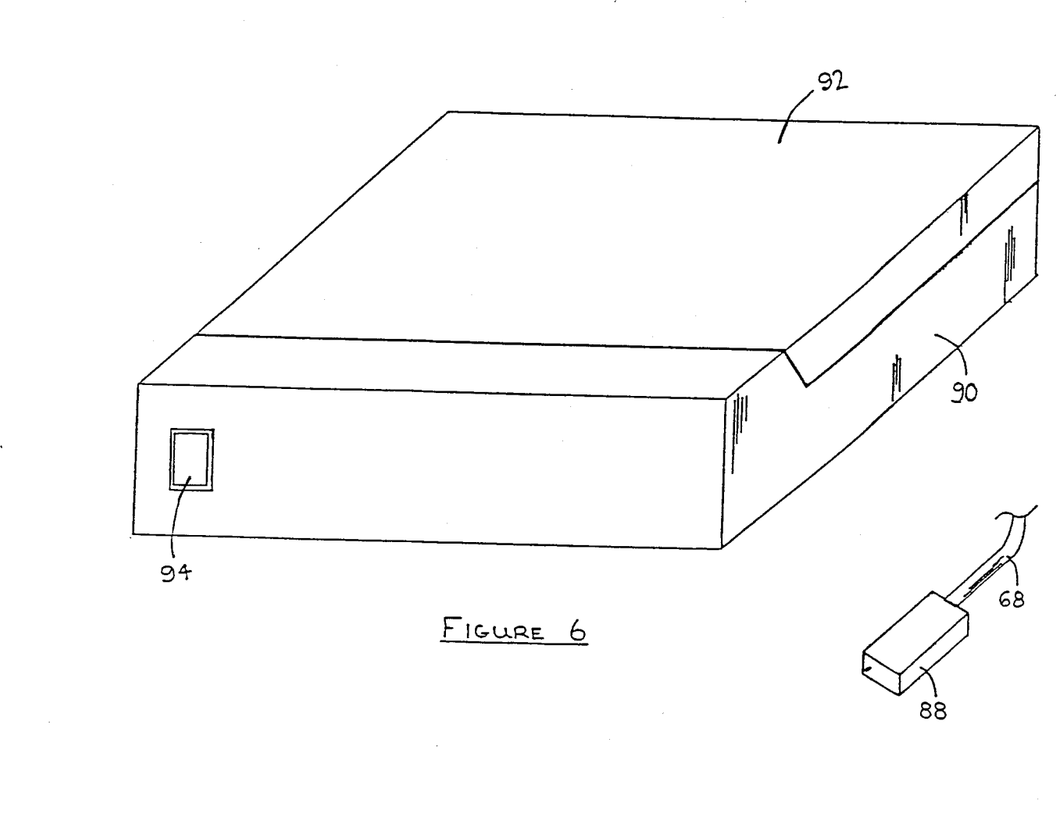
FIG. 6 is a perspective view of a control box for the toothbrush with a closed cover.
Figure 7:
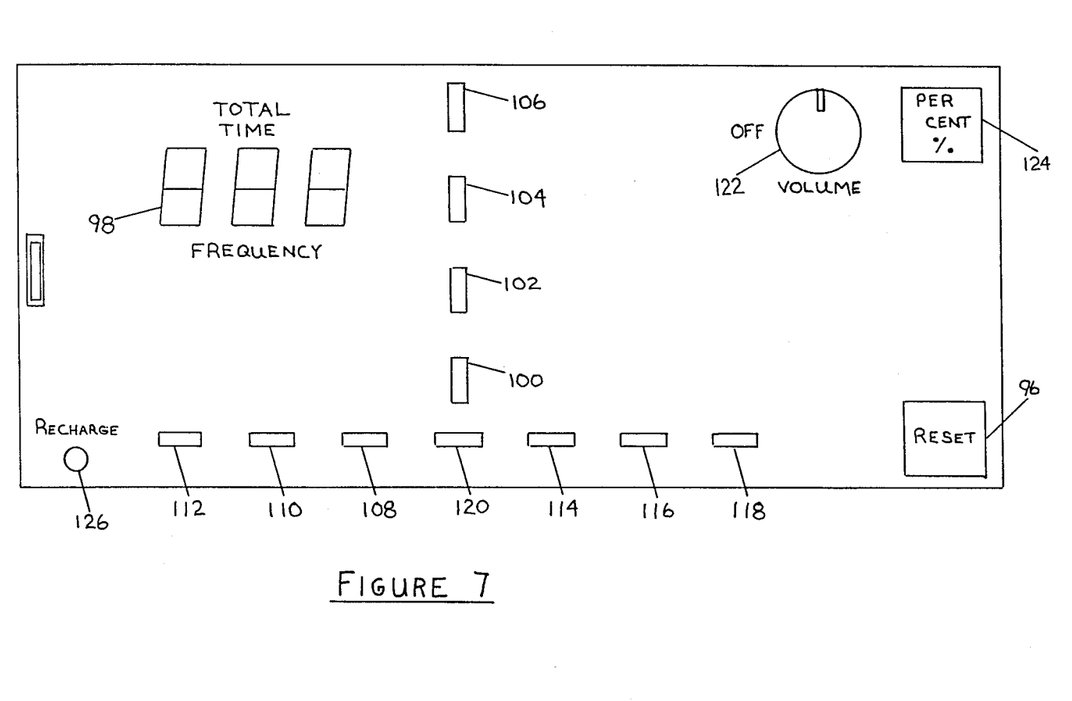
FIG. 7 is a side view of part of an inside surface of the cover of the control box when the cover is open.

The wire 68 extends between the handle 56 and a plug 88 shown in FIG. 6. A control box 90 has a cover 92 with a release button 94 located at a front of said box 90. When it is desired to open said control box 90, the release button 94 is manually depressed and the cover 92 automatically flips open to expose an inside surface of the cover as shown in FIG. 7. The cover 92 is spring-mounted (not shown). When it is desired to close the cover 92, it can be manually forced into the position shown in FIG. 6 and it will remain in that closed position until such time as the release button 94 is again depressed.

As shown in FIG. 7, when the cover 92 is opened, a reset button 96 is automatically released, thereby activating the device. Conversely, when the cover 92 is closed, the reset button 96 is automatically depressed and the device is turned off. A liquid crystal display 98 displays the duration and frequency of the brushing process. Light emitting diodes (henceforth LEDs) 100, 102, 104, 106 measure a longitudinal pressure exerted on the bristles. LEDs 108, 110, 112 measure lateral pressure from one side of the bristles and LEDs 114, 116, 118 measure lateral pressure from an opposite side of the bristles. LED 120 is activated whenever the power of the device is on. When the LED 120 is the only LED activated, that is an indication that there is no pressure on the bristles whatsoever. If desired, liquid crystal displays could be used in place of some or all of the LEDs. Similarly, LEDs could be used in place of the liquid crystal display 98.

Preferably, the LEDs 100, 102, 108, 114 and 120 are green in colour. Preferably, the LEDs 104, 110 and 116 are yellow in colour and the LEDs 106, 112, 118 are red in colour. The LEDs can be calibrated to be activated when a certain level of pressure is obtained either longitudinally or laterally on the bristles. It is suggested that LEDs 100, 102, 104, 106 be calibrated to activate when the static pressure exerted longitudinally on the bristles across the head of an ORAL B 30 (a trademark) toothbrush reaches 0.75 pounds, 1.2 pounds, 1.65 pounds and 2.1 pounds respectively. These pressures are measured statically by pressing the bristles longitudinally onto a flat surface and correspond to deflections on a chart recorder of 5 millimeters, 10 millimeters, 15 millimeters and 20 millimeters for the LEDs 100, 102, 104 and 106 respectively. The LEDs 102, 104 and 106 are electronically connected so that only one of them is activated at any given moment. For example, as LED 104 is activated, LED 102 will be deactivated. The chart recorder is described in more detail below. Similarly, it is suggested that LEDs 108, 110 and 112 be calibrated to be activated when the static lateral pressure on one side of the head of an ORAL B 30 toothbrush reaches 0.75 pounds, 1.2 pounds and 1.65 pounds respectively. Similarly, it is suggested that the LEDs 114, 116 and 118 be calibrated to light when the static lateral pressure on an opposite side of the head of an ORAL B 30 toothbrush reaches 0.75 pounds, 1.2 pounds and 1.65 pounds respectively. The static lateral pressure is measured by manually pressing a toothbrush head laterally against a flat surface and measuring the pressure. The lateral pressure of 0.75 pounds, 1.2 pounds and 1.65 pounds correspond to deflections of 5 millimeters, 10 millimeters and 15 millimeters on a chart recorder. The LEDs 108, 110, 112, 114, 116 and 118 are electronically connected so that only one of them is activated at any given moment. The LED 120 is activated whenever there is no pressure exerted on the bristles in either or both the longitudinal or lateral directions.

An off/on volume control button 122 is connected to a high impedence buzzer (not shown). The buzzer is preferably designed to be activated when the static longitudinal pressure across the head of an ORAL B 30 toothbrush exceeds 2.33 pounds. The button 122 preferably allows the volume of the buzzer to be controlled from an "off" position to a maximum of 85 decibels. During operation of the device, the buzzer will be activated when the off/on volume control button 122 is in an "on" position and the minimum pressure for activating the LED 106 has been exceeded by 0.225 pounds.

When a micro-processor is used in the electronic circuit, a percentage button 124 can be installed in the control box 90. When the percentage button is pushed for the first time, all LEDs that were activated during the brushing session, that occurred immediately prior to the percentage button 124 being depressed, will be displayed. Simultaneously, the total time of the brushing session will be displayed. With a second push, the percentage time relative to the total time that brushing occurred in the range of LED 100 will be displayed. A third push will preferably display the percentage time in the range of LED 102. A fourth push will preferably display the percentage time in the range of LED 104. A fifth push will preferably display the percentage time in the range of LED 106. A sixth push will preferably display the percentage time that brushing occurred relative to the total brushing time in the range of LED 120. The seventh push will display the percentage time in the range of LED 108. An eighth push will display the percentage time in the range of LED 110. A ninth push will display the percentage time in the range of LED 112. A tenth push will display the percentage time in the range of LED 114. An eleventh push will display the percentage time in the range of LED 116 and a twelfth push will display the percentage time in the range of LED 118.

A recharge light 126 will be activated when voltage supplied to the system is below the minimum level required by the circuitry.

Figure 7A:
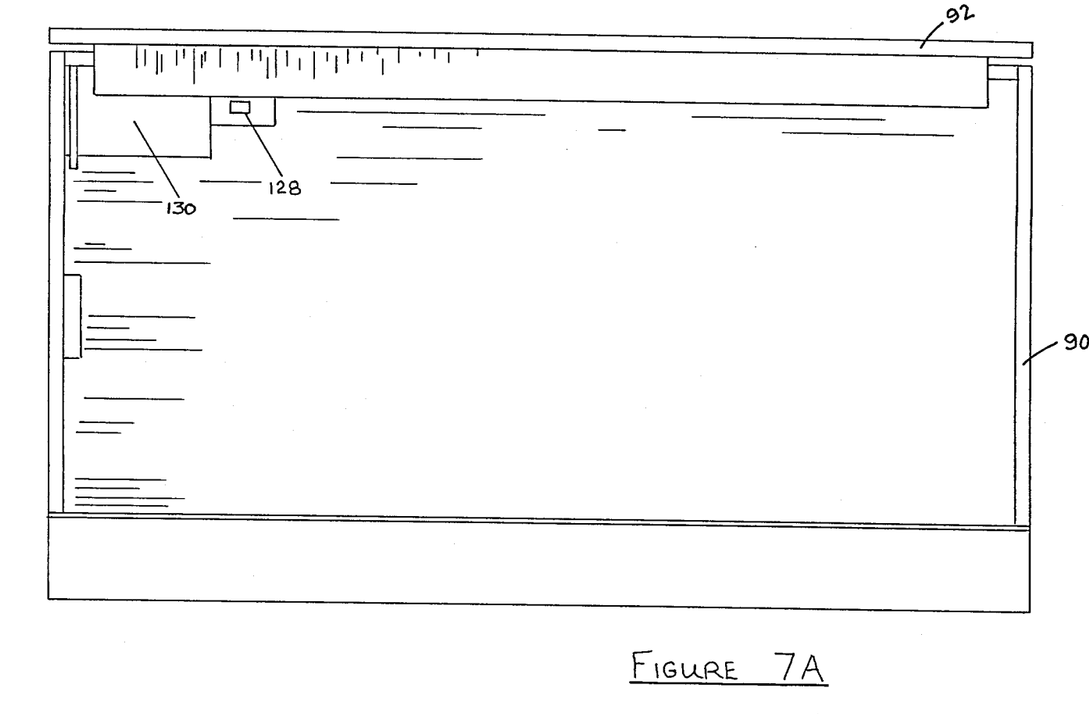
FIG. 7A is a top view of the control box with the cover open.

In FIG. 7A, there is shown a top view of the control box with the cover 92 in an open position. A receptacle 128 is designed to receive the plug 88 that is connected to the toothbrush handle 56 by the wire 68. Adjacent to the receptacle 128 is a power source 130. The power source can be a battery (not shown) or an A.C. source through an adapter (not shown). Preferably, the power source is a rechargeable battery.

Figure 8:
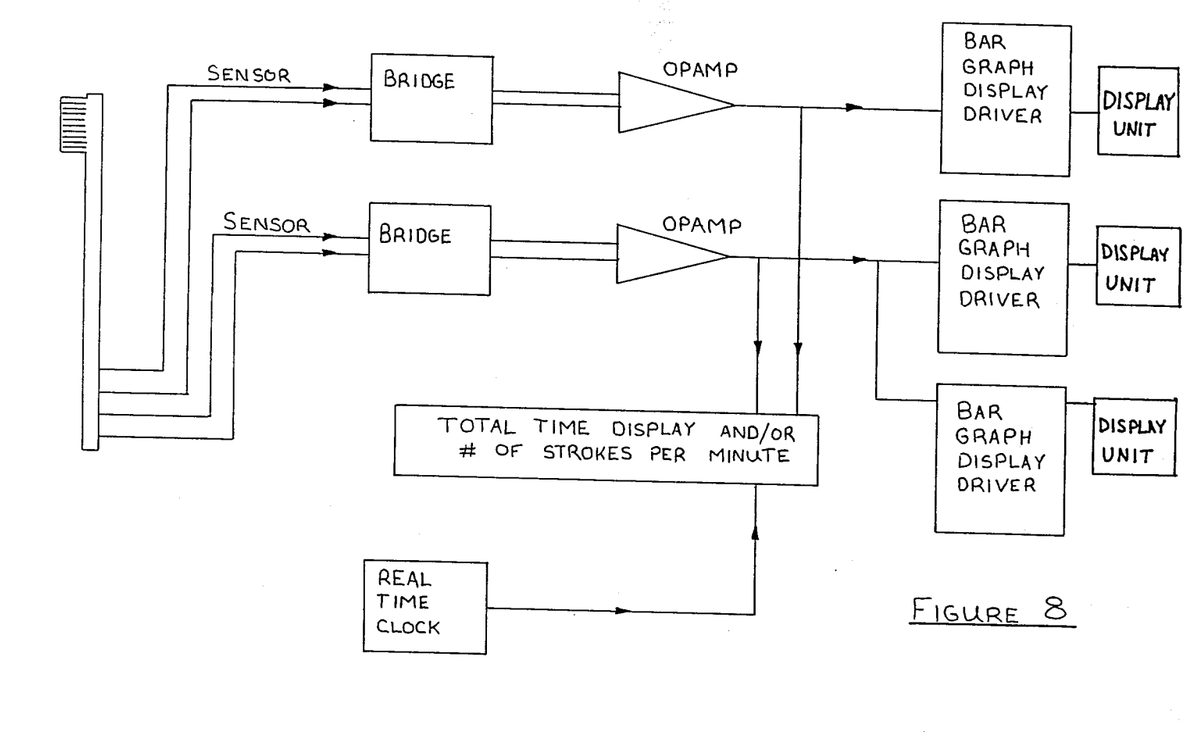
FIG. 8 is a block circuit diagram for a device in accordance with the present invention.

In FIG. 8, there is shown a block circuit diagram showing the wires 68 extending from the toothbrush handle 56. One pair of wires 68 extends from each strain gauge 66. Each pair of wires first passes through a Wheatstone bridge. From the bridge output, the two pairs of wires each pass through an amplifier. The signal from the strain gauge measuring the longitudinal pressure on the bristles passes through a bar graph display driver and then into the desired display units. The signal from the strain gauges measuring the lateral pressure on the bristles pass through two bar-graph display drivers and then to separate display units. The frequency and duration of brushing is also measured.

Figure 9:
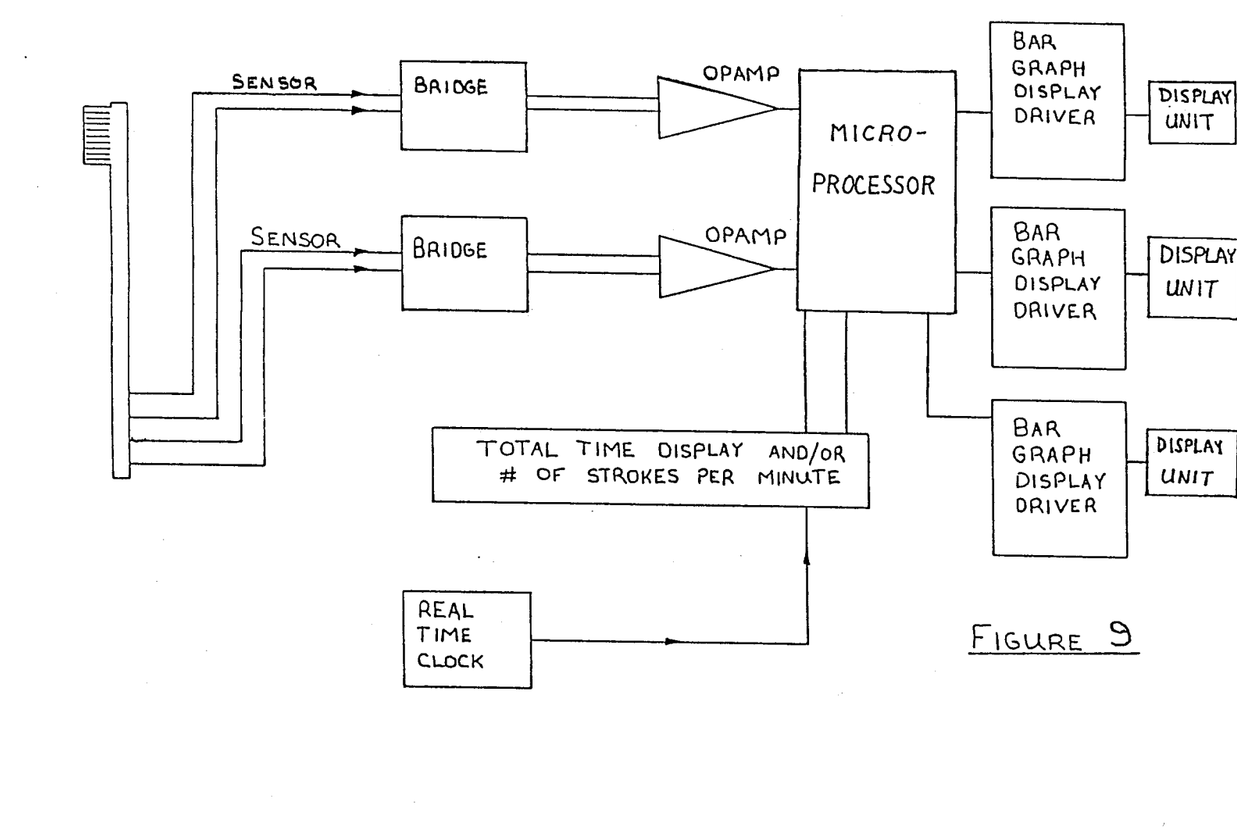
FIG. 9 is a block circuit diagram where a microprocessor has been inserted in the circuit.

In a variation of the circuit diagram of FIG. 8, in FIG. 9, the bar graph display drivers, display units and duration and frequency displays are controlled by a micro-processor. The advantage of the micro-processor is that it can retain data and give statistical readouts. For example, the percent button 124, described in FIG. 7, can record and display the total brushing time during which longitudinal pressure was exerted on the bristles, or, it can be used to produce statistics, or, to determine the proportion of total time spent in brushing particular teeth. Numerous other measurements can be made or recorded using the micro-processor. Various other circuits that are readily apparent to those skilled in the art can be used to carry out the purposes of the present invention and the attached claims are not restricted to any particular circuit.

While many different types of strain gauges can be used as the sensing means 66, other sensing means could also be used. For example, pizao crystals could be used as a sensing means. The particular specifications of strain gauges will vary with the size of the neck 58. One particular size of strain gauge that has been found to work satisfactorily has a width of 2 millimeters, a gauge factor of 2.02 and a resistance of 119.7 ohms. Strain gauges work on the principle that when a wire is stretched elastically, its strength and diameter are altered, resulting in a change in its electrical resistance. Theoretically, the gauge factor is a measurement of the change in resistance compared to the total resistance divided by the correspondence change in length compared to the total length. In practice, the measured gauge factors differ from the theoretical value.

The strain gauges suggested as the sensing means for the present invention are mounted in a conventional manner. The strain gauges are parallel to an edge of the neck and each of the two strain gauges 66 is mounted at the identical lateral and longitudinal distance on each plane or surface 70, 72. It would be possible to design a neck of the handle so that the neck did not have two planes that were normal to one another, or, one plane was not parallel to a plane through a free end of the bristles, or, the planes or surfaces of the neck did not have the same width. For example, the neck could have a cross-section that is triangular or rectangular. These variations could be taken into account through different calibrations of the output signals. However, it is believed that this would unnecessarily complicate the device of the present invention and it is therefore preferable to have a neck with a square cross-section as shown in the drawings.

The strain gauges are usually connected to as to unbalance a four-arm Wheatstone bridge circuit when their resistance is changed by stress. If a strain gauge is connected so that the only source of unbalance is the change of resistance in the gauge resulting from the application of strain of the gauge, the difference in potential across the output terminals of the bridge becomes a measure of that strain. This potential can be measured by a sensitive voltmeter and can be signalled and/or recorded in various ways. Micro-processors and chart recorders are ways to permanently record this changing resistance caused by toothbrush head movement.

Figure 10A:
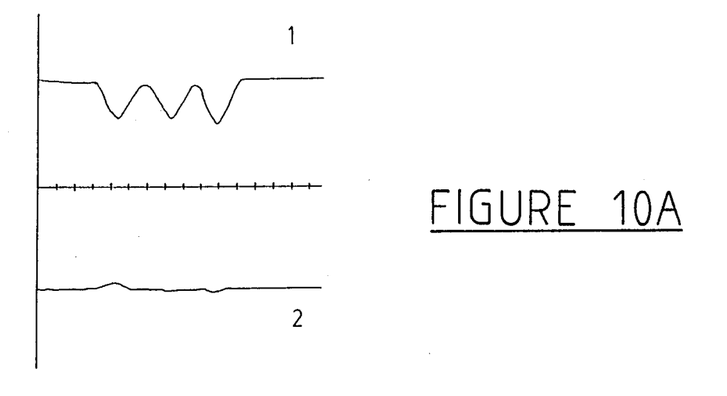
FIGS. 10A, 10B, 10C and 10D show examples of actual results obtained on a bar graph when different types of pressure are applied to bristles of the toothbrush.
Figure 10B:
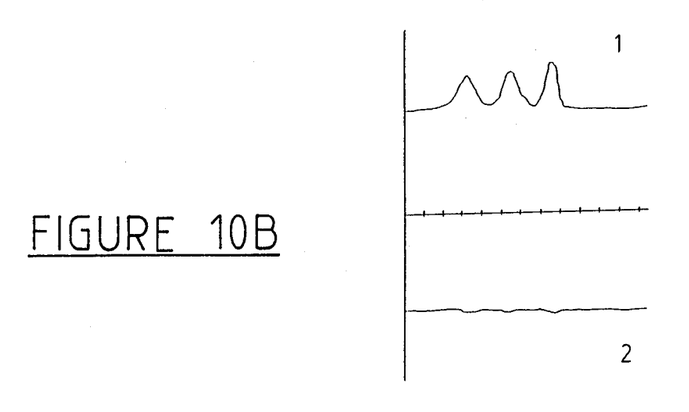
Figure 10C:
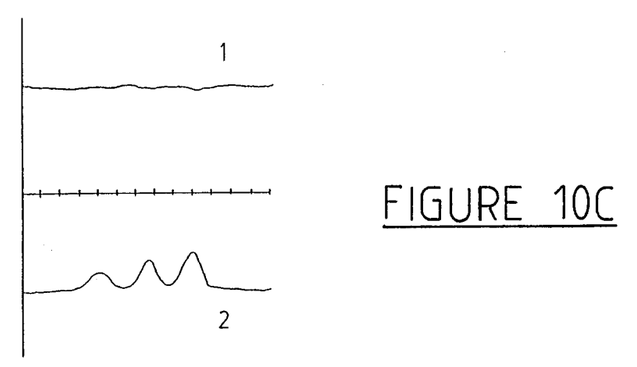
Figure 10D:
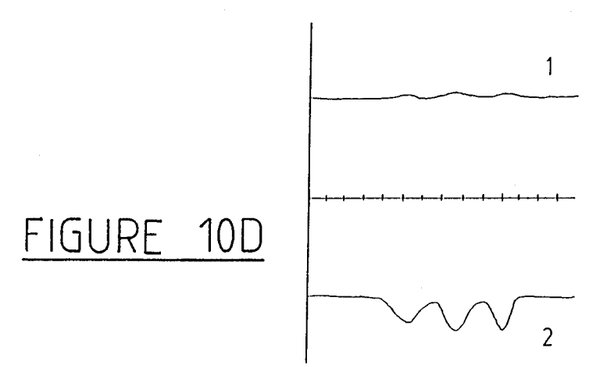

When a chart recorder is chosen, the results can be as shown in FIGS. 10A, 10B, 10C and 10D. It will be noted that in each of these figures, there are two channels shown. Channel 1 represents longitudinal pressure on the bristles and Channel 2 represents lateral pressure on the bristles. When comparing the results obtained using the LEDs shown in FIG. 7 with those obtained using the chart recorder, LEDs 120, 100, 102, 104, 106 correspond to Channel 1 and LEDs 112, 110, 108, 120, 114, 116, 118 correspond to Channel 2. In FIG. 10A, the waves in Channel 1 represent longitudinal pressure repeatedly exerted on the bristles and then released. In FIG. 10B, the waves in Channel 1 represent pressure on the back of the brush in a direction longitudinal to the bristles. In FIG. 10C, assuming that the toothbrush is held in a horizontal position, Channel 2 represents lateral pressure repeatedly exerted on the bristles from above and then released. Similarly, FIG. 10D represents lateral pressure exerted on the brush from beneath the bristles and released. While each toothbrushing process will be different, general patterns do emerge and these patterns are referred to as "toothbrushing signatures".

Figure 11A:
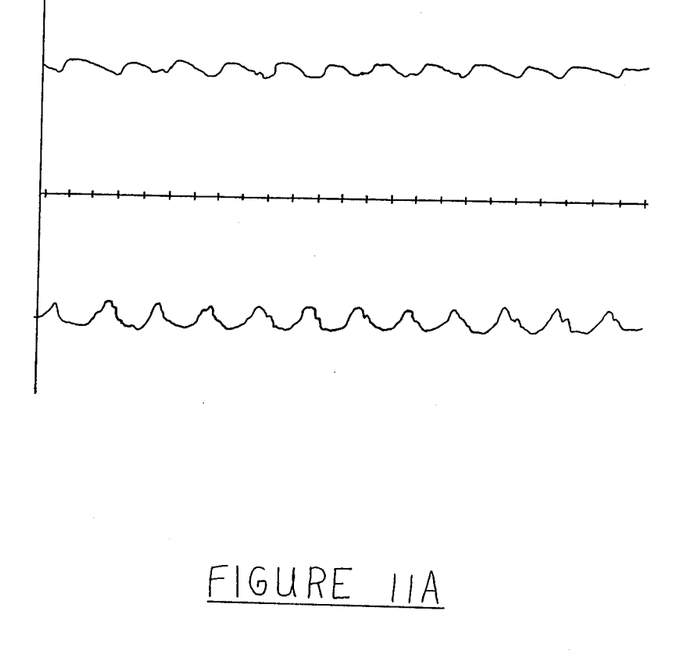
FIGS. 11A and 11B show examples of the actual results obtained on a bar graph when brushing occurs from the gingiva to the teeth.
Figure 11B:
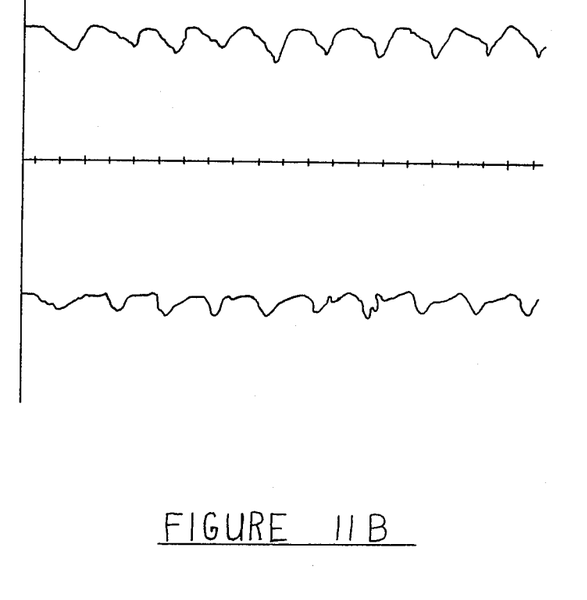

In FIG. 11A, the toothbrushing signature results from moving the brush head from the gingiva to the teeth with the bristles more or less at right angles to the teeth. The brushing occurred on the buccal surface of tooth numbers 42, 41, 31 and 32. In FIG. 11B, the same type of brushing occurred but the lingual surface of tooth numbers 42, 41, 31 and 32 was involved. It will be noticed that the main difference between FIGS. 11A and 11B is that the waves in Channel 2 extend in opposite directions in the two figures. Each peak represents an area of high pressure and each valley represents an area of low pressure.

Figure 12A:
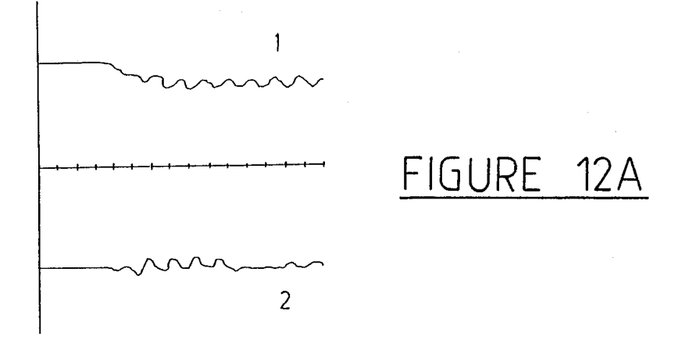
FIG. 12A shows an example of actual results obtained on a bar graph when brushing occurs in a generally horizontal direction.
Figure 12B:
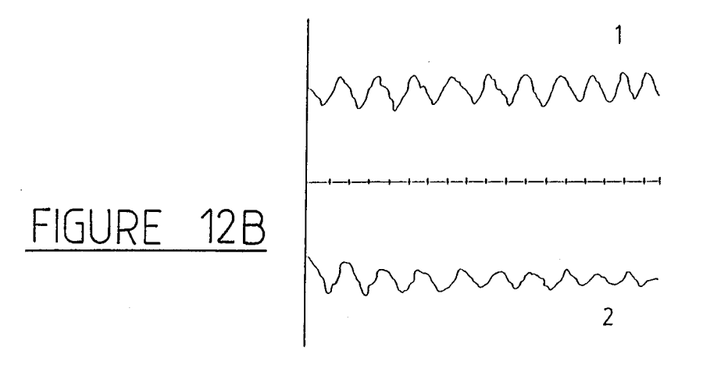
FIG. 12B shows an example of the actual results obtained on a bar graph when circular brushing occurs.

In FIG. 12A, the signature results from brushing on the occlusal surface of tooth numbers 34, 35, 36 and 37 in a generally horizontal direction. Channel 1 shows substantial longitudinal pressure but Channel 2 shows little lateral movement. In FIG. 12B, the signature results from circular brushing on the buccal surface of tooth numbers 12, 11, 21 and 22. It can be seen that the pressure on Channels 1 and 2 are quite close in magnitude and that the lateral pressure shown in Channel 2 occurs in both directions.

Figure 12C:
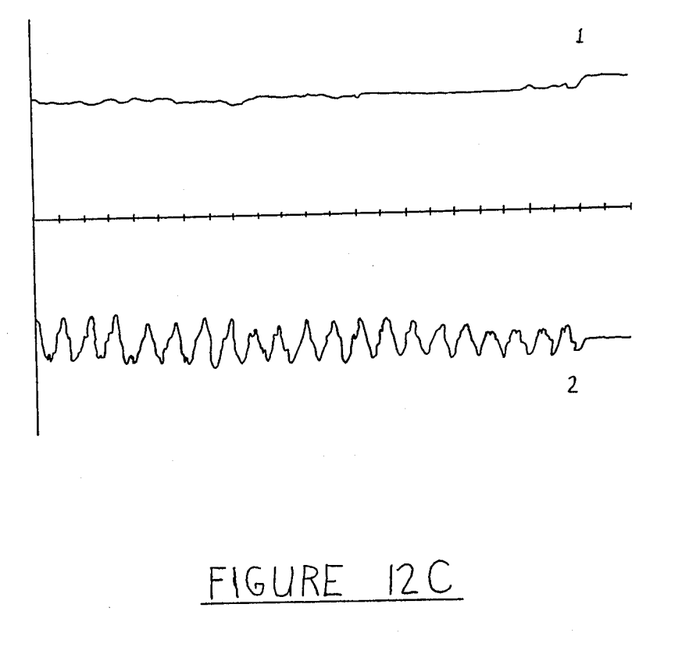
FIG. 12C shows an example of the actual results obtained on a bar graph when brushing occurs in a vertically up and down motion.

In FIG. 12C, the signature results from vertical up and down brushing on the buccal surface of tooth numbers 12, 11, 21 and 22. This is a very common form of improper brushing and it should be noted that the wave in Channel 1 differs substantially from FIG. 12B in that there is constant pressure on the bristles. However, the wave in Channel 2 is similar to the wave of Channel 2 in FIG. 12B as the lateral pressure is in both directions.

It should be noted that FIGS. 10 to 12 are results obtained from actual brushing and results will vary with the brushing habits of individual subjects. However, it can be seen that the general types of brushing can be readily recognized and a determination can easily be made as to whether or not a particular person is brushing properly. Also, the size of the peaks (i.e. the vertical distance between the peak and the base line) can be measured to obtain the actual pressure being exerted in each stroke. Further, the frequency of the brushing stroke (i.e. the wave peaks per second) can also be readily determined as the speed of the bar graph is known. Also, duration of the brushing session can be measured directly from the chart of the bar graph since the rate of moment of the chart paper is predetermined. In the examples discussed above, the chart moved at the rate of twenty-five millimeters per second.

From numerous bar graph results recorded from actual users, it has been found that an acceptable pressure in a direction longitudinal to the bristles, without causing abrasion in a person with healthy teeth, ranges from 0.75 to 1.2 pounds of static pressure measured across the head of an ORAL B 30 toothbrush.

While ORAL B 30 toothbrush heads were used in the above examples, virtually any toothbrush head can be used with the device of the present invention. Various materials can be used for the head and the handle. However, the handle must be sufficiently flexible and resilient so that readings of the bending moment are obtainable as pressure is exerted on the bristles of the head. It is suggested that the handle be made from injection molded nylon, the same material that is presently used for most toothbrushes. The collar can be made of any surgical grade metal, for example, stainless steel or chronium alloy. Various other materials for the head and handle will be readily apparent to those skilled in the art. Preferably, both the handle and head are sterilizable.

It is suggested that the device of the present invention can be used in dental offices to teach patients how to properly brush their teeth. For this purpose, a microprocessor or a bar graph recorder will likely yield the most appropriate signals. The signalling devices can be readily designed so that successive visual or audio signals are given as pressure increases or if the actual pressure is outside a certain range of pressure. Similarly, a signal can be given when an improper frequency or the total time duration is exceeded. Also, a signal can be given when the direction of brushing is improper. Numerous variations can be made in the signalling devices and it is considered that those skilled in the art will have no difficulty in making the invention from the block circuit diagrams and the other information disclosed in the specification. The device of the present invention could also be used in the home by persons who wish to improve their brushing habits. Devices designed for use in the home will likely be less sophisticated and less expensive than those designed for use in dental offices.

Visual and/or audio signals can be given as pressure occurs on the bristles outside an acceptable range. Signals can also be given when acceptable frequency levels or duration is exceeded or the direction of brushing is improper.

What we claim as our invention is:

1. A device for monitoring the process of toothbrushing, said device comprising a toothbrush having a handle with a neck and a removable and replaceable head, said neck being located between said head and a remainder of said handle, said neck having means to consecutively receive various heads so that when pressure is exerted on said head it will be transmitted to said neck, said head having numerous bristles thereon and said bristles having a free end, said handle having at least two sets of sensing means affixed thereto in an area of said neck to linearly measure a bending moment of the area to which each set of sensing means is attached, said handle having two non-parallel planes with one set of sensing means on each plane, each plane being parallel to a longitudinal axis of said handle, each set of sensing means being electrically connected to different signalling means so that a two dimensional signal can be activated as pressure is exerted on said bristles.

2. A device as claimed in claim 1 wherein the neck is a narrowed portion relative to the remainder of the handle.

3. A device as claimed in claim 2 wherein the neck has two non-parallel planes and the sensing means are located on the neck of said handle.

4. A device as claimed in claim 1 wherein said two planes are normal to one another.

5. A device as claimed in claim 3 wherein one of said planes is parallel to a plane through the free end of said bristles.

6. A device as claimed in claim 5 wherein each of said planes has the same width where said width is measured in a direction across said brush handle and said sensing means are mounted in an identical longitudinal and lateral position on each lane.

7. A device as claimed in claim 6 wherein the planes are located on a surface of said neck.

8. A device as claimed in any one of claims 2, 5 or 7 wherein the sensing means are strain gauges.

9. A device as claimed in claim 7 wherein the sensing means are strain gauges that are connected to a control box to produce a signal when toothbrushing occurs in a given direction.

10. A device as claimed in claim 9 wherein said strain gauges are connected to a control box to produce a signal when a given time for the toothbrushing process has elapsed.

11. A device as claimed in claim 10 wherein said strain gauges are connected to a control box to produce a signal when a given frequency of brushing strokes over time is obtained.

12. A device as claimed in claim 11 wherein the signal is a visual signal.

13. A device as claimed in claim 12 wherein the signal is an audio signal.

14. A device as claimed in any one of claims 1, 2 or 9 wherein the signal is shown by means of a liquid crystal display.

15. A device as claimed in any one of claims 1, 2 or 9 wherein the signal is displayed on a bar graph recorder.

16. A device as claimed in any one of claims 2, 6 or 9 wherein the signal is displayed on a series of light emitting diodes.

17. A device as claimed in any one of claims 2, 6 or 9 wherein the signal is obtained through a micro-processor and a percentage of a particular time compared to total time can be produced.

18. A device as claimed in claim 11 wherein the signal is a combination of an audio signal and a visual signal.

19. A device as claimed in claim 2 wherein the means to receive various heads is a rigid collar affixed to the neck of said handle, said collar extending beyond said neck, said head having a base that has a similar shape to said collar, but said base having a slightly smaller cross-sectional size than an internal cross-sectional size of said collar so that said base will removably fit snugly within said collar.

20. A device as claimed in claim 19 wherein the collar has a slot located therein and there is a corresponding abutment appropriately located on said base so that, when said base is located within said collar, said abutment will be in said slot.

21. A device as claimed in claim 19 wherein there is a skirt extending outwards from said neck towards a remainder of said handle to cover said strain gauges without contacting them.

22. A device as claimed in claim 21 wherein said skirt is an integral part of said collar.

23. A device as claimed in any one of claims 19, 20 or 22 wherein the collar is formed of a surgical grade metal.

24. A device as claimed in any one of claims 1, 2 or 9 wherein when the toothbrush is moved in a horizontal direction relative to the teeth, an appropriate signal is emitted by the device.

25. A device as claimed in any one of claims 1, 2 or 9 wherein a signal is emitted that varies with the degree and direction of pressure exerted on the bristles.

26. A device as claimed in any one of claims 1, 3 or 6 wherein each of the strain gauges has a width of 2 millimeters, a gauge factor of 2.02 and a resistance of 119.7 ohms.

27. A device as claimed in any one of claims 2, 6 or 9 wherein the signal is displayed on a series of light emitting diodes, said diodes being successively activated as the pressure across the head of the toothbrush increases or decreases in a longitudinal direction or in a lateral direction.

28. A device as claimed in any one of claims 2, 7 or 9 wherein the signal is displayed on a series of light emitting diodes that are successively activated as pressure across the head increases or decreases, said diodes being calibrated so that a first diode in the series is activated when static pressure across the head in a given direction reaches approximately 0.75 pounds and successive light emitting diodes are activated as said pressure increases by increments of approximately 0.45 pounds.

* * * * *